United States Patent Office 3,809,690
Patented May 7, 1974

3,809,690
18-(ALKYL-ACYLAMINO)-14β,16β,20-TRIHYDROXY STEROIDS AND METHODS FOR THEIR PREPARATION
Ulrich Kerb, Rudolf Wiechert, Ulrich Eder, and Hans-Detlef Berndt, Berlin, Germany, assignors to Hoffmann-La Roche Inc., Nutley, N.J.
No Drawing. Filed Mar. 20, 1972, Ser. No. 236,241
Claims priority, application Germany, Mar. 23, 1971, P 21 14 646.3; Jan. 14, 1972, P 22 02 409.5; Jan. 27, 1972, P 22 04 359.0
Int. Cl. C07c *169/20, 173/00*
U.S. Cl. 260—239.5          22 Claims

ABSTRACT OF THE DISCLOSURE

A new class of 18-(alkyl-acylamino)-14β,16β,20-trihydroxy steroids is described. These compounds are useful as cardiac agents, diuretics and as intermediates in the preparation of other pharmaceutically active compounds.

BRIEF DESCRIPTION OF THE INVENTION

The present invention relates to 18-(alkyl-acylamino)-14β,16β,20-trihydroxy steroids of the general formula

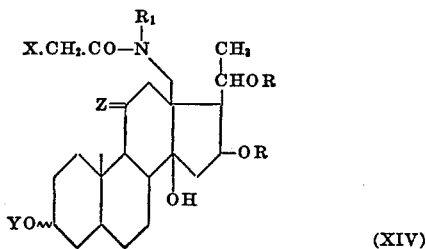

(XIV)

wherein R is hydrogen or lower acyl, $R_1$ is hydrogen or lower alkyl, X is halogen or a free or esterified hydroxy group, Y is hydrogen, acyl or alkyl and Z is an oxygen atom, H,H or H,$OR_2$ wherein $R_2$ is hydrogen or acyl.

The compounds of Formula IV of the present invention are prepared by a multistep process starting with compounds of the general formula

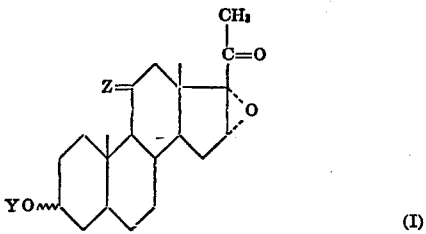

(I)

wherein Y and Z are as above.

In the first step the 20-keto group is reduced in a manner known per se and the resulting 20-hydroxy-16α,17α-epoxy steroid is treated with lead tetraacetate in the presence of iodine to produce an 18-acetoxy-16α,17,18,20-bis-epoxy-steroid of the formula

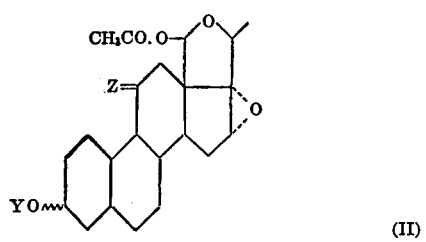

(II)

wherein Y and Z are as above.

The acetoxy group in the 18-position is hydrolyzed to produce the corresponding 18-hydroxy-16α,17,18,20-bis-epoxy-steroid of the following formula

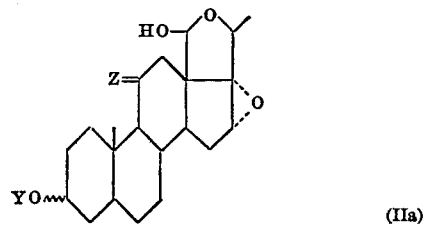

(IIa)

wherein Y and Z are as above.

The 20-hydroxy group is then oxidized to a keto group so as to yield a 16α,17-epoxy-18-al-20 keto steroid of the formula,

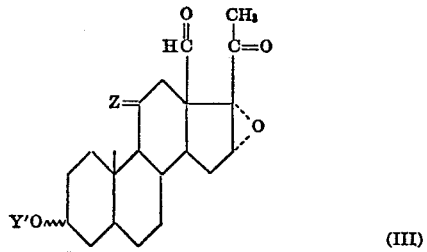

(III)

wherein Y' is lower acyl or lower alkyl and Z is as above.

Prior to effectuating the above oxidation step a 3-hydroxy if present in the starting material should be acylated so as to protect this position from possible oxidation.

The next step of the reaction process involves treatment of compounds of Formula III above with chromium (II) acetate in the presence of an organic base so as to prepare the 16α-hydroxy-18-al-20-keto steroids of the formula

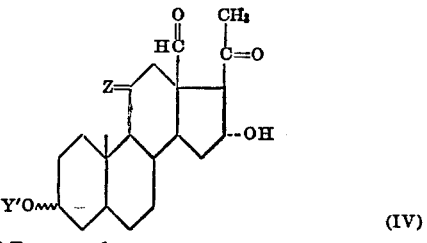

(IV)

wherein Y' and Z are as above.

The 20-keto group of the compounds of IV is then reduced utilizing lithium aluminum-trialkoxy hydride thereby yielding 16α,18-dihydroxy-18,20-epoxy steroids of the formula

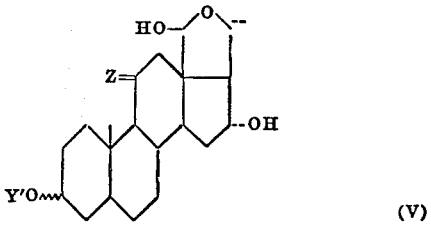

(V)

wherein Y' and Z are as above.

Alternatively, a compound of Formula III may be treated with chromium (II) acetate in an organic base and the resulting 16α-hydroxy-18-al-20-keto steroid of formula IV can be treated without isolation with sodium borohydride so as to produce the half acetal of Formula V.

The compounds of Formula V may then be oxidized in the 16- and 18-positions to produce the corresponding 20-hydroxy-16-oxo-18-acid lactone (18→20) (Va).

Halogenation in the 15-position followed by dehydrohalogenation serves to introduce the 14(15)-double bond thereby yield the 20-hydroxy-16-oxo-14(15)-dehydro-18-acid lactone (18→20) of the formula

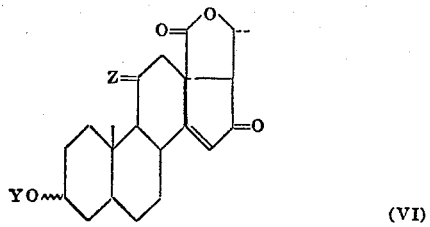

(VI)

wherein Y and Z are as above.

Reduction of the above compounds with lithium aluminum trialkoxy hydride produces the corresponding 16β,20-dihydroxy-14(15)-dehydro-18-acid lactone (18→20) of the formula

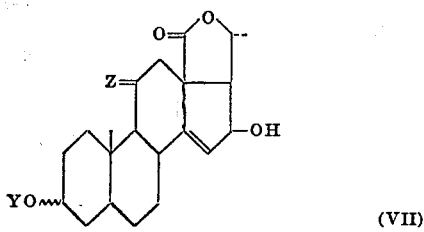

(VII)

wherein Y and Z are as above.

The above compounds are then treated with a peracid so as to produce a 16β,20-dihydroxy-14,15β-epoxy-18-acid lactone (18→20) of the formula

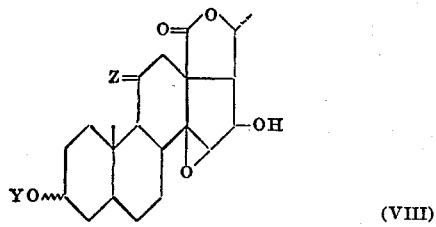

(VIII)

wherein Y and Z are as above.

Reduction of the above epoxy compound results in the preparation of the 14β,16β,18,20-tetrahydroxy pregnanes of the formula

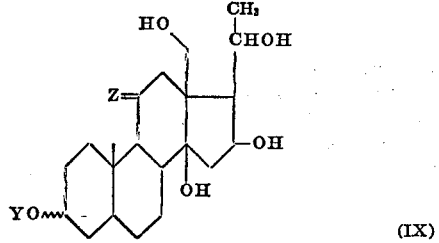

(IX)

wherein Y and Z are as above.

The above compounds are then treated with acetone in the presence of an acid catalyst so as to prepare the 16,20-dihydroxy - 14,18 - isopropylidenedioxy-pregnane of the formula

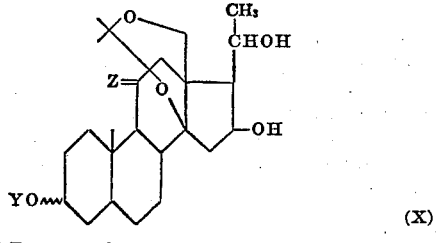

(X)

wherein Y and Z are as above.

The compounds of Formula X are then converted to the corresponding 20-hydroxy-14,18-isopropylidenedioxy-16β-acyloxy pregnanes by acylation in the 16-position. The latter compounds are then treated with acid so as to effect splitting of the 14β,18-acetonide protective group. The freed 18-hydroxy group in the resulting 14β,18,20-trihydroxy-16β-acyloxy steroid is oxidized to produce a 14β,18-dihydroxy-16β-acyloxy-18,20-epoxy steroid of the formula

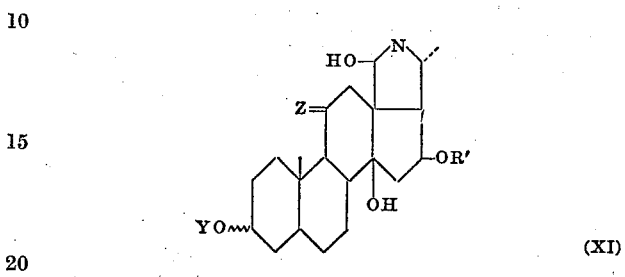

(XI)

wherein R' is lower acyl and Y and Z are as above.

Treatment of the compounds of Formula XI with a lower alkylamine at elevated reaction temperature results in simultaneous saponification of a 16β-acyloxy group and the introduction of an alkylamino group so as to produce the 18-(alkylamino) - 14β,16β - dihydroxy-18,20-epoxy pregnanes of the formula

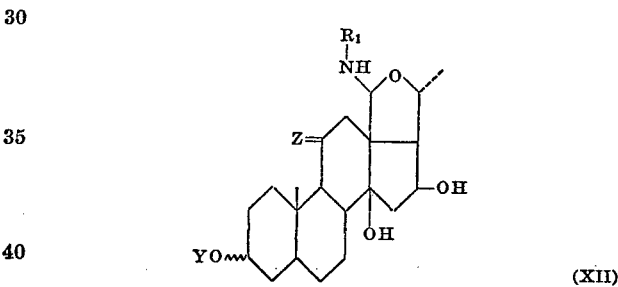

(XII)

wherein $R_1$ is lower alkyl and Z and Y are as above.

Reduction of the above compounds of Formula XII results in the corresponding 18-(alkylamino)-14β,16β,20-trihydroxy-pregnanes of the formula

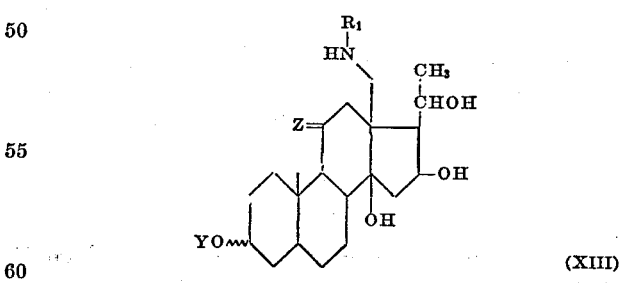

(XIII)

wherein $R_1$, Y and Z are as above.

In the final step of the process for the preparation of the compounds of the present invention, compounds of Formula XIII are dissolved in an inert solvent and then treated with a substituted acetic acid of the formula

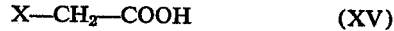

X—CH₂—COOH        (XV)

wherein X is halogen or a free or esterified hydroxy group so as to effectuate acylation on the nitrogen atom. If desired protective groups in the 3-position and/or in the substituent X may be split off utilizing procedures known per se. Alternatively, the corresponding hydroxy groups may be esterified utilizing lower alkanoic acids or reactive derivatives thereof.

In a process variation to the sequence described above, the compounds of Formula IX may be reacted with a triaryl halomethane to yield a compound of the formula

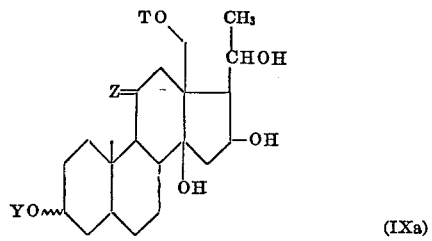

(IXa)

wherein T is triarylmethyl and Y and Z are as above.

Partial acylation of the above compounds results in the preparation of a compound of the formula

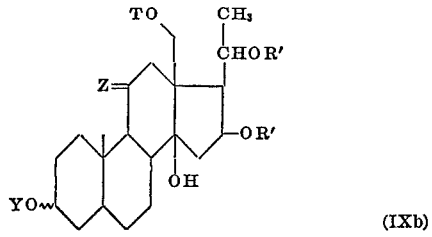

(IXb)

wherein R', T, Y and Z are as above.

The 18-position protective group may then be removed utilizing an acid medium so as to obtain the corresponding 14β,18-dihydroxy-16β,20-diacyloxy-pregnane of the formula

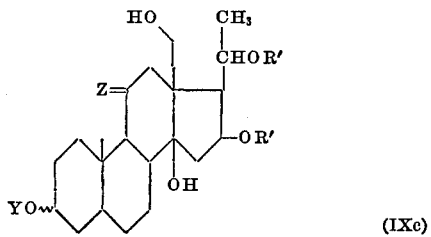

(IXc)

wherein R', Y and Z are as above.

Oxidation of the above compound yields the 18-aldehyde of the following formula

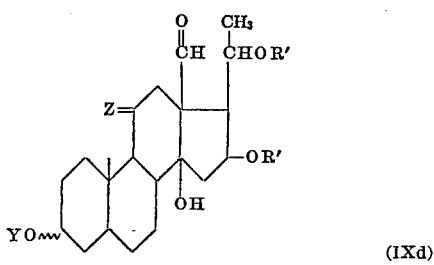

(IXd)

wherein R', Y and Z are as above.

Treatment of the compound of Formula IXd with a lower alkylamine in an inert organic solvent followed by reduction yields an 18-amino compound of the formula

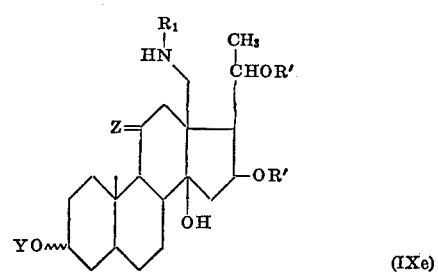

(IXe)

wherein R', R₁, Y and Z are as above.

Then in the final step as before the compound of Formula IXe is treated with a substituted acetic acid of the Formula XV followed by removal or introduction of appropriate protective groups.

The term lower alkyl as used herein is meant to include branched or straight chain saturated hydrocarbon radicals having from 1 to 7 carbon atoms. Suitable lower alkyl groups for the purpose of the present invention include methyl, ethyl, n-propyl, t-butyl, n-heptyl and the like. The term alkyl as utilized herein, particularly when bonded to an oxygen or nitrogen atom, is especially meant to include lower alkyl groups.

The term acyl as utilized herein includes radicals derived by the removal of the terminal hydroxy group from carboxylic acids which are generally known to be useful in the esterification of free hydroxy groups in steroid chemistry. These carboxylic acids can be straight chain or branched chain, saturated or unsaturated and may contain one or more carboxylic groups. Preferred members of the acyl groups utilized herein are carboxylic acids having 1-11 carbon atoms. Lower acyl is meant to include acyl groups having 1-5 carbon atoms.

Suitable carboxylic acids utilized as acyl groups herein include lower alkanoic acids which may contain additional substitutions such as halo, phenyl, amino, hydroxy, cycloalkyl and the like; as well as aryl carboxylic acids such as benzoic acid. Examples of suitable carboxylic acids falling within the scope of the acyl group hereunder include formic acid, acetic acid, propionic acid, caproic acid, enanthic acid, undecyl acid, chloroacetic acid, hydroxy acetic acid, amino acetic acid, diethyl acetic acid, trimethyl acetic acid, tert.-butyl acetic acid, cyclopentyl propionic acid, cyclohexyl acetic acid, phenyl acetic acid, benzoic acid, succinic acid and the like.

In the final product of the present invention, i.e., compounds of Formula IV the substituent group X may be halogen or a free or esterified hydroxy group. When X is an esterified hydroxy group X will preferably be sulfonyloxy or a lower acyloxy group. When X is halogen, it preferably will be choloro, bromo or iodo. The case where X is a sulfonyloxy, it will be preferably be derived from an aliphatic or aromatic sulfonic acid which are generally known to be employed in the esterification of hydroxy groups. Especially preferred for this purpose are mesyloxy and tosyloxy groups. Preferred lower acyloxy groups in the definition of X include formyloxy and acetoxy.

The OY substituent group in the 3-position and the 20-hydroxy group can have the α or β configuration in the compounds described herein.

During the reactive procedures described herein for the preparation of the compounds of the present invention it is preferred that the 3-position hydroxy group be maintained in protected form. Suitable protective groups for this purpose are well known to one skilled in the art. For example the protection of a 3-hydroxy group may conveniently be accomplished by acylation with one of the above-named acids, particularly acetic acid, or through etherification.

The reaction steps described previously may be conducted in known manner utilizing solvents or solvent mixtures which are conventional in the art. For example one may employ halogenated hydrocarbons such as methylene chloride, ethylene chloride, chloroform, carbon tetrachloride and the like; alcohols such as methanol, ethanol, n-butanol, tertiary butanol and the like; and preferably cyclic ethers such as tetrahydrofuran or dioxane or with hydrocarbons such as benzene, toluene, cyclohexane and the like. The selection of a particular solvent will of course depend upon their respective inertness to the reagents to be employed in the particular reaction step as well as the solubility of the particular steroidal compounds involved in such solvent.

In the first step of the sequence the reduction of the 20-keto group in the starting material of Formula I to the corresponding 20-hydroxy-16α,17α-epoxy steroid follows procedures well known in the art.

The aforesaid reduction may be conveniently conducted utilizing a metal hydride such as an alkali borohydride, for example, sodium-, potassium- or calcium borohydride; or a lithium aluminum trialkoxy hydride, such as for example, lithium aluminum tri-tert.-butoxy hydride. The use of sodium borohydride is especially preferred when the steroid molecule contains acyloxy groups which should not be attacked during the course of the reaction.

The second step of the procedure involves the conversion of 20-hydroxy-16α,17α-epoxy steroid to 18-acetoxy half acetals of Formula II utilizing lead tetraacetate in the presence of iodine. This hypoiodide reaction is conducted with light irradiation and at elevated reaction temperatures, especially preferred being the reflux temperature of the solvent. Especially preferred solvents for this reaction step are the high boiling aromatic or saturated hydrocarbons, such as for example, cyclohexane, benzene, heptane, methyl cyclohexane and the like. In reviewing the procedure of this reaction step which is conducted on a substrate which at the same time contains the 16,17-oxido ring and the 20-hydroxy, it is believed that it would be expected that under the extreme reaction conditions used that there would be an attack on the oxido ring with a formation of a 17,20-dihydroxy structure which in turn would undergo oxidative cleavage of a 17-position side chain. The fact that these side reactions were not observed must be considered unexpected.

In the third process step esterification to introduce an 18-position acyloxy group into the 18-hydroxy-16α,17-18, 20-bis-epoxy-steroid of Formula IIa is conducted in known manner. It is especially desired that the esterification be conducted under mild conditions such as for example with alkali hydroxide in a lower alkanol such as for example methanol or ethanol, at temperatures below room temperature especially in the range of from about —3° to +3° C. Under these conditions a previously introduced protective group in the 3-position is not attacked. If one utilizes other known esterification conditions it may be necessary to reintroduce an attacked protective group.

In the fourth reaction step the 18-hydroxy-16α,17,18, 20-bisepoxy-steroids are selectively oxidized to the keto aldehydes of Formula III. It is prefered to employ a mild oxidation agent in this step. The preferred procedure for carrying out the desired selective oxidation of the 20-hydroxy group is to employ dimethylsulfoxide as the oxidation agent in the presence of a pyridine-sulfur trioxide complex and a strong organic base, for example, trimethylamine, triethylamine, diisopropyl-ethylamine and the like, wherein the desired conversion goes very well at a reaction temperature below room temperature, such as for example, in the range of between 0° to 25° C. and is completed generally with good yield in 15–45 minutes. When utilizing these conditions it is possible to employ the 3-position hydroxy group either in free or protected form since the desired oxidation reaction proceeds in a manner so that the 3-hydroxy group remains essentially unattacked. However, in order to minimize side reactions and in view of the later reaction step involving conversion of compounds of Formula V to Formula Va it is particularly desired to utilize the 3-hydroxy group in protected form.

Besides the indicated preferred procedure it is possible to utilize other customary oxidation procedures (in which the 3-keto group must be in protective form), such as dimethyl sulfoxide in acetic anhydride, or chromic acid in acetone or ether, which procedures, however, although applicable, when used result unavoidably in the formation of a more or less major proportion of undesired side product.

The fifth reaction step involves conversion of compounds of Formula III to compounds of Formula IV by reductive opening of the 16α,17α-oxido ring with chromium (II) acetate. The conversion is conducted in the presence of an organic base such as for example, pyridine, pyrazine, pyrazole, quinoline, isoquinoline, pyrrole and the like. While it is possible to utilize the aforementioned bases as solvents also, it is also possible to utilize an inert solvent in the reaction mixture such as tetrahydrofuran and dioxane. For a smooth conduct of the reaction it is desirable to run the reaction at a low reaction temperature preferably between —5° C. up to +10° C. and to avoid going over above about 30° C. The smoothness of the conduct of this reaction could not have been predicted a priori especially in view of the known labileness of the 16-hydroxy group which in the present process under the indicated reaction conditions is not split off. Reduction reactions utilizing chromium (II) acetate are well known. However in the literature procedures this reaction is conducted in an acid reaction medium, especially in the presence of acetic acid. The yields obtained by such procedures are relatively low so that the known methods are not useful for commercial applications.

The following partial reduction step (process step 6) of the 20-keto group of a 16α-hydroxy-18-al-20-keto-steroid of the Formula IV is carried out in a customary solvent such as dioxane, tetrahydrofuran, diglyme and the like utilizing a lithium aluminum trialkoxy hydride. A preferred reducing agent is lithium aluminum tri-tertiarybutoxy hydride. The reaction temperature should be maintained in the range of from —5° C. to 25° C., preferably between about 0° C. to +5° C. The original 16α,20-dihydroxy-18-al steroid is isolated in the form of its half acetal, i.e., the 16α,18-dihydroxy-18,20-epoxide of Formula V. The selective reduction procedure involving the reduction of the 20-keto group in the presence of the 18-position aldehyde group was unexpected and not forseeable.

In the alternate and preferred route in the process scheme for conversion of compounds of Formula III to compounds of Formula V the 16α,17 - epoxy-18-al-20-ketosteroid of Formula III is treated in the presence of an organic base such as pyridine, pyrazine, pyrazole, quinoline, isoquinoline, pyrrole and the like with chromium (II) acetate. Preferably, the above base will function at the same time as the solvent for the reaction, although it is possible to employ in the reaction mixture an inert solvent such as for example tetrahydrofuran or dioxane. In this procedure the intermediate 16α-hydroxy-18-al-20-ketosteroid of Formula IV is then treated without isolation from the reaction mixture with sodium borohydride in a suitable solvent such as for example, water, methanol, ethanol, dimethylformamide, dioxane, diglyme and the like. The reaction temperature is maintained in the range of from about —25° to +25° C. For best results it is necessary that the temperature does not rise above 30° C. The outcome of this process aspect must be considered unexpected in that two primarily different reducing agents by successive application to a 16α,17-epoxy-18-al-20-ketosteroid converted it into 16α,18-dihydroxy-18,20-epoxy steroid.

One skilled in the art would have expected that the sodium borohydride would have smoothly converted both carbonyl groups that is, the aldehyde group in the 18-position and the 20-keto group, to the corresponding hydroxy groups by reduction.

The following oxidation of the 16- and 18-position hydroxy groups (7th process step) and the introduction of the 14(15) double bond (8th process step) to produce the 20 - hydroxy-16-oxo-14(15)-dehydro-18-acid lactone (18→20) of Formula VI follows such procedures that one skilled in the art would customarily employ for the step. The oxidation step most desirably utilizes chromium (III) oxide in glacial acetic acid.

The introduction of a 14(15) double bond into the aforesaid 20-hydroxy-16-oxo-18-acid lactone (18→20) can be carried out utilizing known procedures, for example by halogenation, preferably bromination, in glacial acetic acid at preferably elevated temperatures such as in the range of from about 40–80° C. and then dehydrohalogenating the thus obtained 15-bromo-20-hydroxy-16-oxo-18 acid lactone (18→20) in a known manner such as for example by treating in the presence of an organic base such as preferably pyridine and potassium acetate or in dimethylformamide in the presence of an alkali salt such as lithium- or calcium carbonate and an alkali halide such as lithium- or calcium bromide.

The following reduction of the 16-keto group of compounds of Formula VI to the 16β-hydroxy group of compounds of Formula VII (9th process step) can follow procedures ordinarily employed by one skilled in the art for ketone reduction. Suitable reducing agents for this purpose include for example lithium aluminum tri-tertiary-butoxy hydride. The reaction is conducted in a solvent such as for example tetrahydrofuran or dioxane. Since the reduction proceeds slowly at room temperature it is desirable to conduct the reaction at an elevated reaction temperature such as for example in the range between 50° C. and 100° C. more desirably, at the reflux temperature of the solvent.

The epoxidation of the allyl alcohols of Formula VII to the 16β,20 - dihydroxy - 14,15β-epoxy-18-acid lactone (18→20) of Formula VIII (10th reaction step) also follows epoxidation procedures well known in the art. Preferred epoxidation agents include the peracids such as peracetic acid, perbenzoic acid, m-chloroperbenzoic acid, perphthalic acid and the like. The starting steroids used in this step are of sufficient stability so as to allow the use of elevated reaction temperatures for this conversion, such as for example, the reflux temperature of the solvents employed. Preferred solvents include the halogenated hydrocarbons such as methylene or ethylene chloride, chloroform or also ethers such as dioxane or tetrahydofuran.

The conditions employed for the conversion of the compounds of Formula VIII to compounds of Formula IX that is the simultaneous reductive opening of the (18→20) lactone and the 14β,15-oxido ring (11th process step) follows reduction procedures which are analogous to the procedures generally known by one skilled in the art for that purpose. Metal hydrides, such as for example, lithium aluminum hydride of lithium borohydride or diborane are especially useful reducing agents. It should be understood that during the course of reaction that acyl groups protecting hydroxy groups may be hydrolyzed and that therefore either in the next step or in a later step the acyl group may again be introduced. Preferred solvents for use in this reduction step includes dioxane or tetrahydrofuran and the reaction may preferably be conducted at elevated temperatures such as for example in the range of from about 50° C. to 120° C. most preferably at the reflux temperature of the aforesaid solvent. An alternate procedure for the desired reduction of compounds of Formula VIII to compounds of Formula IX involves catalytic hydrogenation employing a noble metal catalyst (such as platinum or platinum oxide in glacial acetic acid) most preferably at elevated pressures. It should be noted, however, that in such reduction procedure, that if the starting material contains a keto group it will be reduced.

The introduction of the actonide group into the compounds of Formula IX so as to produce compounds of Formula X (12th process step) can follow procedures that are known for the preparation of protected hydroxy groups such as for example by the reaction of acetone in the presence of an acid catalyst such as borontrifluoride (preferably in the form of the etherate complex), p-toluenesulfonic acid or perchloric acid. Tetrahydrofuran is the preferred solvent for this process. The fact that reaction proceeds in selective fashion is highly unexpected. The starting material contains four hydroxy groups and therefore a uniform course of reaction could not be expected.

Then follows the acylation of the 16β,20-dihydroxy-14β,18-isopropylidenedioxy pregnane of Formula X in the 16-position as well as simultaneously acylating any present-3-hydroxy group. Suitable acyl groups are those that have been described previously above. The esterification follows procedures that are well known in the art. In other to avoid undesired side reactions (especially attack on the acetonide ring and esterification of the 20-hydroxy group) the selective esterification of the 16-position hydroxy group preferably utilizes the known basic esterification methods such as in pyridine most desirably with the use of elevated reaction temperature, preferably in the range of from about 50–120° C.

The following cleavage of the 14,18-position acetonide protective group (process step 14) also follows known methods. For example, by treatment with aqueous mineral acids such as sulfuric- or hydrochloric acid or p-toluenesulfonic acid in a water miscible solvent.

The following oxidation step (process step 15) involving conversion of 14β,18,20-trihydroxy-16β-acyloxy steroids to 14β,20-dihydroxy-18-aldehyde of Formula XI (which are also isolated in the form of their 18,20-half acetal) again follows procedures which are well known such as for example the conversion of compounds of Formula IIa to compounds of Formula III as has been described above. Since this reaction is conducted in the presence of a 20-hydroxy group it is preferred that a milder oxidation agent be employed such as preferably dimethyl sulfoxide as it described with regard to process step 4 above. The selective oxidation of only the -18-position carbon atom must be considered surprising.

The introduction of the amino group into the 18-position (process step 16) during the conversion of compounds of Formula XI to compound of Formula XII also follows known procedures which one skilled in the art should generally be aware of. The starting steroid is dissolved in an organic solvent such as an alcohol for example methanol, ethanol, etc. or in tetrahydrofuran or dioxane and the solvent is mixed with the desired amine such as methyl-, ethyl-, propyl-, butyl-, and the like amines. It is preferable to conduct the reaction at elevated temperatures especially in the range of from about 80–13° C. and therefore in view of the low boiling point of the lower amines it is necessary to conduct the reaction under pressure in a pressure flask. If the 16-position substituent is an acyloxy group then it will be hydrolyzed also in the course of the N-alkylation.

The reduction of compounds of Formula XII to compounds of Formula XIII (17th process step) follows also known methods for effectuating hydrogenation utilizing either metal hydrides or a noble metal catalyst. A preferred procedure utilizes catalytic hydrogenation in the presence of known noble metal catalysts such as platinum especially platinum oxide. A suitable solvent for this purpose is glacial acetic acid.

Then follows the N-acylation (process step 18) involving conversion of compounds of Formula XIII to compounds of Formula XIV utilizing an α-substituted acetic acid of the formula X—CH$_2$—COOH. Reaction is conducted by dissolving the starting steroid in a suitable solvent such as tetrahydrofuran or dioxane and then adding thereto the acylation agent preferably in the form of its halogenide such as the acid chloride or acid bromide or as the anhydride at low temperatures, most preferably at about 0° C. Generally the desired acylation proceeds readily to completion at a reaction temperature in the range of 0° C. to 10° C. in about 20 to 45 minutes with the reaction temperature not being allowed to increase beyond room temperature. The smooth conversion of compounds of Formula XIII to compounds of Formula XIV is also surprising in that the N-acylation can be accomplished without attack of the additionally present free hydroxy groups in the 14- and especially in the 16- and 20-positions.

It is within the scope of the present invention that the substituent group X can have the meaning of a hydroxy group by hydrolyzing in a manner known per se the corresponding compound containing the lower acyloxyor sulfonyloxy group. The free hydroxy group for this substituent can similarly be esterified with a desired lower alkanoic acid or sulfonic acid.

In the case where Z is the group $H,OR_2$ then it is preferred to utilize an alternate reaction procedure wherein one reacts a compound of Formula IX with a triarylhalomethane so as to protect the 18-hydroxy group. For this purpose one would dissolve the 18-hydroxy pregnane of Formula IX an in organic base such as for example, pyridine, pyrazine, pyrazole, quinoline, isoquinoline, pyrrol, picoline, lutidene, collidine and the like and react it with a reactive form of a triarylhalomethane such as for example, triphenylchloromethane, chloro-tris-p-methoxyphenyl methane, chloro-bis(p-methoxyphenyl)-phenyl methane, p-(chlorodiphenylmethyl)-anisol utilizing a temperature in the range of 0–35° and most especially at about room temperature. The reaction is complete after a few hours.

The esterification of the remaining free hydroxy groups such as the 14-position hydroxy group can follow procedures known in the art, for example such as that described in process step 13.

The protective group on the 18-position hydroxy group can be split off by heating preferably at a temperature about 50° C. in an acidic medium such as for example dilute hydrochloric acid or 80% sulfuric acid.

The oxidation of the 18-hydroxy group into an 18-oxo group follows in analogous fashion to process step 4.

The following amination of the 18-oxo group can be conducted under relatively mild reaction conditions such as one skilled in the art could utilize for the reaction of an aldehyde and a primary amine. The lower alkylamine such as for example methyl, ethyl-, propyl- or butylamine is mixed with the starting steroid at a temperature in the range of from about −10 to about +35° C. most preferably at about room temperature in an organic solvent such as for example, a loweralkanol such as methanol or ethanol or in a cyclic ether, i.e., dioxane. By proceeding carefully with the reaction the present acyloxy groups are not saponified.

The following reduction of the condensation product follows in analogy to the process step 16 except under milder reaction conditions. The reaction of the 18-amino steroid with a α-substituted acetic acid follows in analogy to reaction step 18.

During the course of the reaction processes described herein it may be necessary to remove a 3-position protective group which have been introduced into the starting material of Formula I. The removal of a protective group can follow procedures which are well known in the art. If the 3-position substituent is an acyloxy group such as a acetoxy group and in the last desired reaction product of Formula XIV the 3-position substituent should be a 3-hydroxy group then it is possible to hydrolyze the 3-acyloxy group utilizing procedures known per se. Should it be necessary to split off a present acyl group then one can employ procedures which are generally known to be useful in the saponification of esters. A suitable procedure for example would be alkali saponification utilizing potassium hydroxide in methanol.

In view of the reactivity of the (X—$CH_2$—CO—)-substituent the 18-position nitrogen atom the saponification should be conducted under alkali reaction conditions. Additionally, if desired the protective group introduced for the conversion of compounds of Formula XII to compounds of Formula XIII can be removed. Should the protective groups in the course of the reaction be attacked such as for example the 3-acyloxy group in the course of the conversion of compounds of Formula VIII to compounds of Formula IX, it may be necessary depending on the selection of reaction conditions for the following process steps to reintroduce such groups.

The compounds of the present invention of Formula XIV exhibit valuable pharmacological activity. Included therein are blood pressure lowering and diuretic activity, positive inotropic and myotropic activity, increase of the heart muscle blood flow and the increase in the stroke minute volume of the heart.

The compounds of the present invention may be employed in the form of pharmaceutical preparations which contain them in admixtures with pharmaceutical organic or inorganic carrier materials which are suitable for enteral or parenteral application such as, for example, water, gelatin, lactose, starches, magnesium stearate, talc, vegetable oils, gum arabic, polyalkylene glycols, Vaseline, etc. The pharmaceutical preparations can be prepared in solid form (e.g., as tablets, dragées, suppositories, capsules) or in liquid form, e.g., as solutions, suspensions or emulsions. They may be sterilized and/or contain additives such as preserving, stabilizing, wetting or emulsifying agents, salts for varying the osmotic pressure or buffers. They can also contain other therapeutically valuable substances.

The compounds of Formula XIV can be administered at dosages adjusted to individual requirements and fitted to the pharmaceutical exigencies of a situation.

In addition the compounds of the present invention are useful as intermediates as well as starting materials for the synthesis of highly active steroid compounds especially those such as for example batrachotoxin where the carbon atom at $C_{14}$ and $C_{18}$ bear an oxazepine ring.

EXAMPLE 1

To a solution of 300 g. of 3β-acetoxy-16α,17-epoxy-5β-pregnan-20-one in 6,000 ml. of tetrahydrofuran there was added dropwise a solution containing 150 g. of sodium borohydride dissolved in 750 ml. of water and the reaction mixture thereafter was stirred for two hours at 25° C.–30° C. The reaction mixture was then thrown into ice water, acidified with dilute sulfuric acid and extracted with methylene chloride. The methylene chloride phase was washed to neutrality and concentrated, there was thus obtained 20R and 20S:3β-acetoxy-16α,17-epoxy-5β-pregnan-20-ol which can be utilized in crude form in the next step.

An analytical sample of the product was obtained through fractional crystallization from acetone-hexane. 20R:3β-acetoxy-16α,17-epoxy - 5β - pregnan-20-ol melted at 178° C.–179° C. 20S:3β-acetoxy-16α,17-epoxy-5β-pregnan-20-ol melted at 129.5° C.–130.5° C.

EXAMPLE 2

A total of 70 g. of 3β-acetoxy-16α,17-epoxy-5β-pregnan-20-ol in 6,000 ml. of cyclohexane was treated with 400 g. of lead tetraacetate and 52.8 g. of iodine and the mixture was heated at reflux for 90 minutes under illumination with three 300 watt lamps. The reaction mixture was then cooled to about 15° C., the insoluble salts filtered off and washed with cyclohexane. The filtrate, after washing with sodium thiosulfate solution and water was concentrated in vacuo. The residue was dissolved in 2,000 ml. of glacial acetic acid and then stirred for 30 minutes at 100° C. with 70 g. of silver acetate and thereafter the reaction mixture was thrown into ice water. The resulting precipitate was filtered off, taken up into methylene chloride and after filtration and washing to neutrality the methylene chloride solution was concentrated in vacuo. The residue was chromatographed on silica gel and eluted with a hexane-acetone mixture to give 3β,18-diacetoxy-16α,17,18,20-bis-epoxy-5β-pregnane. After recrystallization from acetone-hexane the 20R:18-diastereomeric mixture melted at 112° C.–114° C. and the 20S:18-diastereomeric mixture at 149.5° C.–160° C.

EXAMPLE 3

A total of 234 g. of 3β,18-diacetoxy-16α,17,18,20-bis-epoxy-5β-pregnane was dissolved in 2,200 ml. of methanol, cooled to 0° C., treated with a solution of 8.8 g. of potassium hydroxide in 8,000 ml. of methanol and thereafter stirred for 90 minutes at about 2° C. Then together with 10 ml. of glacial acetic acid the reaction mixture was concentrated in vacuo, the residue dissolved in methylene chloride and chromatographed on silica gel. The desired product 3β-acetoxy-16α,17,18,20-bisepoxy - 5β - pregnan-18-ol was eluted with a hexane-acetone mixture. After recrystallization from acetone-hexane there was obtained 20R:18-diastereomeric mixture melting at 182° C.–184° C. and the 20S:18-diastereomeric mixture melting at 160° C.–167° C.

EXAMPLE 4

A total of 88 g. of 3β-acetoxy-16α,17,18,20-bisepoxy-5β-pregnan-18-ol was dissolved in 1,250 ml. of dimethyl sulfoxide, treated with 430 ml. of triethylamine and thereafter treated under stirring and cooling to 15° C. with portions of a total of 300 g. of a pyridine-sulfur trioxide complex. After 20 minutes the reaction mixture was stirred into 10 liters of ice water and 230 ml. of concentrated sulfuric acid and 180 g. of sodium acetate were added. The precipitated reaction product was filtered off, washed with water and taken up into methylene chloride. The methylenechloride solution was concentrated in vacuo, the residue dissolved in benzene and chromatographed on silica gel. There was eluted with hexane-acetone (7:3) the product 3β-acetoxy-16α,17-epoxy-20-oxo-5β - pregnan-18-al and after recrystallization from acetone it melted at 169° C.–170° C.

EXAMPLE 5

A total of 70 g. of 3β-acetoxy-16α,17-epoxy-20-oxo-5β-pregnan-18-al was dissolved in 1,200 ml. of pyridine, added to 430 ml. of ice cold water and treated with 160 g. of chromium (II) acetate. The reaction mixture was stirred for 75 minutes at about 20° C., added to ice water acidified with sulfuric acid, extracted with methylene chloride, the organic phase was washed to neutrality with water, dried over sodium sulfate and concentrated in vacuo. There was thereby obtained 65 g. of crude 16α hydroxy-3β-acetoxy-20-oxo-5β-pregnan-18-al (melting at 189° C.–193° C. with decomposition). This material was dissolved in 600 ml. of absolute tetrahydrofuran and with ice cooling was treated dropwise with 75 g. of lithium aluminum tritertiarybutoxy hydride in 500 ml. of tetrahydrofuran. The reaction solution was stirred at 5° C. for 15 minutes and then thrown into hydrochloric acid acidified ice water. The reaction product was filtered off, washed to neutrality with water, taken up in methylene chloride and concentrated in vacuo. The residue was chromatographed on silica gel and the desired product was eluted with hexane-acetone. The product 20R:16α,18-dihydroxy-3β-acetoxy-18,20-epoxy-5β-pregnane after recrystallization from acetone-hexane melted at 115° C.–125° C.

EXAMPLE 6

A total of 43.1 g. of 20R:16α,18-dihydroxy-3β-acetoxy-18,20-epoxy-5β-pregnane was dissolved in 600 ml. of glacial acetic acid, treated with a solution of 89 g. of chromium trioxide in 340 ml. of water and then stirred for 30 minutes at 20° C.–25° C. The reaction mixture was thrown into ice water, the resulting precipitate filtered off, washed in water and then taken up in methylene chloride. After being washed to neutrality and dried, the methylenechloride solution was evaporated and the residue recrystallized from acetone-hexane. There was thus obtained 20R:20-hydroxy-3β-acetoxy - 16 - oxo-5β-pregnan-18-acid lactone-(18→20) which melted at 181.5° C.–182.5° C.

EXAMPLE 7

A total of 45 g. of 20R:20-hydroxy-3β-acetoxy-16-oxo-5β-pregnan-18-acid lactone-(18→20) was heated in 820 ml. of glacial acetic acid to 60° C. and then treated dropwise with 120 ml. of a bromine solution in glacial acetic acid (6.1 ml. of bromine). The reaction solution was stirred for 30 minutes at 60° C. and then thrown into ice water containing sodium acetate. The resulting precipitate was filtered off, washed with water, taken up in methylene chloride and after washing to neutrality the dried methylene chloride solution was concentrated in vacuo. There was thus obtained crude 15-bromo-20-hydroxy-3β-acetoxy-16-oxo-5β-pregnan-18-acid lactone-(18→20) which was dissolved in 500 ml. of dimethyl formamide and treated with stirring for 30 minutes at 125° C. with 23 g. of lithium carbonate and 16 g. of lithium bromide. After cooling to 20° C. the reaction mixture was thrown into ice water containing glacial acetic acid, the precipitated product filtered off, washed with water to neutrality and dried. After recrystallization from acetone-hexane there was obtained 20R:20-hydroxy - 3β - acetoxy-16-oxo-5β-pregn-14-en-18-acid lactone (18→20) melting at 166.5° C.–170° C.

EXAMPLE 8

A total of 30.7 g. of 20R:20-hydroxy-3β-acetoxy-16-oxo-5β-pregn-14-en-18-acid lactone-(18→20) was heated to reflux for 30 minutes in 300 ml. tetrahydrofuran containing 32 g. of lithium aluminum-tri-tert.butoxy-hydride and then thrown into sulfuric acid containing ice water. The resulting precipitated product was filtered off, washed to neutrality with water and dried. After recrystallization from acetone-hexane there was obtained 20R:16β,20-dihydroxy - 3β - acetoxy - 5β - preg-14-en-18-acid lactone (18→20) melting at 192.5° C.–194.5° C.

EXAMPLE 9

A total of 30.7 g. of 20R:16β,20-dihydroxy-3β-acetoxy-5β-preg - 14 - en - 18 - acid lactone-(18→20) was heated under reflux for 60 minutes in 300 ml. of methylene chloride containing 30 g. of sodium sulfate, 15 g. of potassium acetate and 30 ml. of 40% peracetic acid. The reaction mixture was diluted with methylene chloride, the methylene chloride solution was washed to neutrality with sodium carbonate solution and water and evaporated. The residue was chromatographed on silica gel. There was thus obtained 20R:16β,20-dihydroxy-3β-acetoxy-14,15β-epoxy-5β,14β-pregnan-18-acid lactone-(18→20) which after elution with hexane-acetone (7:3) and recrystallization from acetone-cyclohexane melted at 200.5° C.–201° C.

EXAMPLE 10

A total of 21 g. of 20R:16β,20-dihydroxy-3β-acetoxy-14,15β - epoxy-5β,14β-pregnan-18-acid lactone-(18→20) was heated at reflux for one hour in a solution of 2,000 ml. of absolute tetrahydrofuran containing 20 g. of lithium aluminum hydride. The reaction mixture was cooled in a methanol ice bath and treated dropwise with ethyl acetate until the excess lithium aluminum hydride was decomposed. Then together with 5 liters of ethyl acetate the ethyl acetate solution was washed to neutrality with 1 N sulfuric acid and water and then concentrated. The residue was recrystallized from tetrahydrofuran-ethyl acetate. There was thus obtained 3β,14β,16β,18,20-penta-hydroxy-5β-pregnane melting at 220° C.–222° C.

EXAMPLE 11

A total of 2.5 g. of 3β,14β,16β,18,20-pentahydroxy-5β-pregnane was dissolved in 150 ml. of tetrahydrofuran and then together 100 ml. of acetone and 0.1 ml. of boron-trifluoride etherate was stirred for three hours at 0° C.–5° C. Then the reaction mixture was evaporated in vacuo with additional pyridine. There was thus obtained crude 3β,16β,20 - trihydroxy-14β,18-isopropylidenedioxy-5β-pregnane which was dissolved in 16 ml. of pyridine and together with 8 ml. of acetic anhydride was heated at 100° C. for three hours. The solution was concentrated in vacuo, treated with cyclohexane and then evaporated to dryness once more. The thus obtained crude 20-hydroxy-14β,18-isopropylidenedioxy - 3β,16β - diacetoxy-5β-pregnane was dissolved in 32 ml. of tetrahydrofuran and then together with 3.2 ml. of 2 N hydrochloric acid was allowed to stand for 30 minutes at room temperature. Thereafter the reaction mixture was diluted with methylenechloride, washed to neutrality and concentrated in vacuo. The residue was recrystallized from acetone-hexane. There was thus obtained 14β,18,20-trihydroxy - 3β,16β - diacetoxy-5β-pregnane melting at 103° C.–105° C.

EXAMPLE 12

To a total of 3.8 g. of 14β,18,20-trihydroxy-3β,16β-diacetoxy-5β-pregnane in 19 ml. of dimethylsulfoxide and 17 ml. of triethylamine there was added slowly dropwise a solution of 11 g. of pyridine-sulfur trioxide complex in 35 ml. of dimethyl sulfoxide, the addition being at a rate so as the temperature did not rise above 20° C. Then the reaction mixture was stirred for 60 minutes at 20° C., diluted with methylene chloride and the methylene chloride solution was washed to neutrality with ice cold 0.1 N hydrochloric acid and water and then concentrated in vacuo. The residue was dissolved in benzene/methylene chloride and chromatographed on silica gel. There was eluted with hexaneacetone (1:1) the desired 14β,18-dihydroxy-3β,16β-diacetoxy - 18,20 - epoxy - 5β-pregnane which after recrystallization from cyclohexane melted at 94° C.–98° C.

EXAMPLE 13

A total of 580 mg. of 14β,18-dihydroxy-3β,16β-diacetoxy-18,20-epoxy-5β-pregnane in a solution of 9 ml. of ethanol and 1 ml. of ethylamine was heated at 120° C. for 4.5 hours in a pressure vessel. After the reaction mixture was evaporated to dryness in vacuo. There was thus obtained 18-(methylamino)-14β,16β-dihydroxy-3β - acetoxy-18,20-epoxy-5β-pregnane which was dissolved in 6 ml. of glacial acetic acid and then together with 200 mg. of platinum oxide hydrogenated at 80° C. The reaction mixture was worked up by dilution with methylene chloride, the catalyst was filtered off and washed with methylene chloride and the filtrate was washed to neutrality with sodium bicarbonate and then water. The solution was then concentrated in vacuo. The obtained crude 18-(methylamino)-14β,16β,20β - trihydroxy - 3β - acetoxy-5β-pregnane was dissolved in 10 ml. of absolute tetrahydrofuran and after cooling to 0° C. the solution was treated dropwise with 11.3 ml. of a chloroacetylchloride solution in tetrahydrofuran (0.67 ml. of chloroacetylchloride in 100 ml. of tetrahydrofuran). The reaction mixture was stirred for 10 minutes at 0° C. to —5° C. and then thrown into ice water. The mixture was extracted with methylene chloride, washed to neutrality with water and concentrated. Utilizing thin- layer chromatography in a system of benzene-methanol (8:2) there was isolated 18-(methyl-chloroacetylamino) - 14β,16β,20 - trihydroxy-3β-acetoxy-5β-pregnane which when recrystallized from acetone-pentane melted at 192° C.–193° C.

EXAMPLE 14

3α,11α - diacetoxy - 16α,17 - epoxy-5β-pregnan-20-one was reduced in analogous fashion to Example 1 with sodium borohydride and the resulting crude 20-hydroxy compound was treated with lead tetraacetate and iodine in analogy to Example 2. The resulting 3α,11α,18 - triacetoxy-16α,17,18,20-bis-epoxy-5β-pregnane was partially saponified according to the procedure of Example 3 and thereafter the 18,20-diastereomeric was oxidized with dimethyl sulfoxide in analogy to Example 4. The resulting 3α,11α - diacetoxy-16α,17-epoxy-20-oxo-5β-pregnan-18-al after recrystallizing from acetone-hexane melted at 223–225.5° C.

The starting material may be prepared according to the following procedure:

A two-liter Erlenmeyer flask containing 500 ml. of a medium comprising 1% corn steep liquor, 1% soybean meal and 0.005% soy oil was inoculated with a suspension of *Aspergillus ochraceus* in physiological saline and the inoculated culture was shaken for 2½ days.

A 30 liter steel fermenter containing 15 liters of the same nutrient medium was inoculated with 250 ml. of the culture and the treated medium was stirred for 24 hours at 29° C. with aeration and stirring with 220 revolutions per minute.

A 30 liter steel fermenter was filled with 14.9 liters of a still medium comprising 1% corn steep liquor, 1% soya bean meal, 0.005% soy oil and 0.75% primary potassium phosphate. This medium was treated with 900 ml. of inoculated medium from above and stirred for six hours at 29° C. with stirring at 220 revolutions per minute under aeration (15 liters of air). To the resulting culture medium there is then added a sterile filtered solution of 15 g. of 16α,17-epoxy-4-pregnen-3,20-dione in 200 ml. of dimethylformamide and fermentation is allowed to proceed with stirring and aeration for an additional 27 hours.

After the completion of the fermentation the fermentation broth is extracted with methyl isobutyl ketone and the extract is concentrated to dryness in vacuo with a bath temperature of 45° C. The residue was washed with hexane and the resulting crude product dried in vacuo at 50° C. The crude product was recrystallized from ethanol and there was obtained 6.4 g. of 11α-hydroxy-16α,17-epoxy-4-pregnen-3,20-dione having a melting point of 230–231° C.

4.6 grams of 11α-hydroxy-16α,17-epoxy - 4 - pregnene-3,20-dione was dissolved in 25 ml. of pyridine and together with 4 ml. of acetic anhydride was stirred at 20° C. for 16 hours. The reaction mixture was concentrated in vacuo and the residue was taken up in methylene chloride. After washing to neutrality and removal of the solvent there was obtained 4.3 g. of 11α - acetoxy - 16α,17-epoxy-4-pregnene-3,20-dione melting at 211–213° C.

4.3 g. of 11α-acetoxy-16α,17-epoxy - 4 - pregnen-3,20-dione was dissolved in 40 ml. of dimethlylformamide and then together with 400 mg. of 10% palladium/calcium carbonate was hydrogenated at room temperature. The reaction mixture was filtered, the filtrate added to water and extracted with methylene chloride. After washing with water the organic phase was taken to dryness in vacuo and the residue purified through chromatography on a Kieselgel column. There was obtained 2.9 g. of 11α-acetoxy-16α-,17-epoxy-5β-pregnan-3,20 - dione melting at 217.5–218.5° C.

2.9 g. of 11α-acetoxy-16α,17-epoxy-5β - pregnan - 3,20-dione in 30 ml. of tetrahydrofuran was mixed with 3 g. of lithium aluminum tritertiarybutoxy hydride for 30 minutes at 0° C. and thereafter thrown into sulfuric acid containing ice water. The precipitate was filtered off, washed to neutrality with water and dried. After recrystallization from acetone/hexane the resulting 3α - hydroxy - 11α-acetoxy-16α,17-epoxy-5β-pregnan-20-one melted at 187.5–188.5° C.

2 g. of 3α-hydroxy-11α-acetoxy-16α,17-epoxy-5β-pregnan-20-one was dissolved in 15 ml. of pyridine and then together with 4 ml. of acetic anhydride was stirred for 16 hours at 20° C. The reaction mixture was evaporated in vacuo and the residue was taken up in methylene chloride. After washing to neutrality and removal of the solvent there was obtained 1.9 g. of 3α,11α-diacetoxy-16α-17-epoxy-5β-pregnan-20-one melting at 229–230° C.

EXAMPLE 15

3α,11α,-diacetoxy-16α-17-epoxy-20 - oxo - 5β - pregnan-18-al was treated with chromium (II) acetate in analogous fashion to Example 5 and the crude product was reduced with lithium aluminum tritertiary butoxide. After recrystallization from acetone/hexane there was obtained (20R):16α,18-dihydroxy-3α,11α-diacetoxy-18,20 - epoxy-5β-pregnane melting at 195.5–197.5° C.

EXAMPLE 16

In analogy to Example 6 (20R):16α,18-dihydroxy-3α,11α-diacetoxy-18,20-epoxy-5β-pregnane was oxidized to the 16-keto lactone with chromic acid. The melting point of the product was 261.5–263° C. (acetone/hexane).

EXAMPLE 17

(20R):20-hydroxy-3α,11α - diacetoxy - 16 - oxo - 5β-pregnan-18-acid lactone (18→20) was brominated in glacial acetic acid and HBr was eliminated in analogy to Example 7. There was thus obtained (20R):20-hydroxy-3α,11α-diacetoxy-16-oxo-5β-pregn-14-en-18 - acid lactone (18→20) melting at 237.5–238.5° C. after recrystallization from acetone/hexane.

EXAMPLE 18

The (20R):20-hydroxy-3α,11α-diacetoxy-16 - oxo - 5β-pregn-14-en-18-acid lactone (18→20) was reduced with LiAl(t-BuO)$_3$H in analogy to Example 8. After recrystallization from acetone/hexane the product (20R):16β-hydroxy-3α,11α-diacetoxy-5β-pregn-14-en-18 - acid lactone (18→20) melted at 196.5–199° C.

EXAMPLE 19

The (20R):16β,20-dihydroxy - 3α,11α - diacetoxy - 5β-pregn-14-en-18-acid lactone (18→20) was treated with peracetic acid in analogy to Example 9. After recrystallization from acetone/hexane the product (20R):16β,20-dihydroxy-3α,11α - diacetoxy - 14,15β - epoxy - 5β,14β-pregnan - 18 - acid lactone (18→20) melted at 231.5–233° C.

EXAMPLE 20

A total of 14 g. of (20R):16β,20-dihydroxy-3α,11α-diacetoxy - 14,15β - epoxy-5β,14β-pregnan-18-acid lactone (18→20) was dissolved in 500 ml. of absolute tetrahydrofuran, a solution of 14 g. of lithium aluminum hydride in 300 ml. of tetrahydrofuran was added dropwise and the reaction mixture was then heated at reflux for one hour. The reaction mixture with ice cooling was treated dropwise with a saturated sodium chloride solution, diluted with tetrahydrofuran and the tetrahydrofuran phase separated. The tetrahydrofuran extract was washed two additional times with saturated sodium chloride solution and then evaporated in vacuo. The residue was dissolved in tetrahydrofuran, filtered, concentrated and treated with acetone. From this solution there crystallized 3α,11α,14β,16β,18,20 - hexahydroxy-5β-pregnane melting at 130° C. with decomposition.

EXAMPLE 21

A total of 1 g. of 3α,11α,14β,16β,18,20-hexahydroxy-5β-pregnane in 100 ml. of acetone was treated with a solution of 50 ml. tetrahydrofuran containing 150 mg. of p-toluenesulfonic acid with stirring for 15 minutes at 20° C. Thereafter the reaction mixture was concentrated in vacuo in the presence of pyridine and the residue recrystallized from acetone. A total of 310 mg. of the resulting 3α,11α,16β,20-tetrahydroxy-14β,18-isopropylidenedioxy - 5β - pregnane (melting point 263–265° C.) was heated in 4 ml. of pyridine and 2 ml. of acetic anhydride for one hour at 100° C. and then concentrated in vacuo at 40° C. The residue was treated with cyclohexane, again concentrated and the resulting oil recrystallized from acetone/hexane. There was thus obtained 20-hydroxy-14β,18-isopropylidenedioxy - 3α,11β,16β - triacetoxy-5β-pregnane melting at 237–238.5° C.

EXAMPLE 22

A total of 37 g. of (20R):16β,20-dihydroxy-3α,11α-diacetoxy-5β-pregn-14-en-18-acid lactone (18→20) in 600 ml. of ethlyene chloride was treated was 75 g. of m-chloroperbenzoic acid for 2½ hours at 30° C. with stirring. The reaction mixture was worked up in analogy to Example 9. There was thus obtained (20R):16β,20-dihydroxy - 3α,11α-diacetoxy-14,15β-epoxy-5β,14-pregnan-18-acid lactone (18→20) which was identical with the material prepared in Example 19.

EXAMPLE 23

A total of 81.4 g. of 3α,11α-diacetoxy-16α,17-epoxy-20-oxo-5β-pregnan-18-al was dissolved in 1600 ml. of pyridine, and was then treated with ice cooling with a total of 530 ml. of water containing 270 g. of chromium (II)-acetate. The reaction mixture was stirred for 90 minutes at room temperature, cooled to −10 to −15° C. and then a solution containing 45 g. of sodium borohydride in 130 ml. of water was over a period of 25 minutes added dropwise. The mixture was thrown into 8 liters of ice water and 1 liter of concentrated sulfuric acid and then extracted with 5 liters of ethyl acetate. The ethyl acetate solution was washed with water and concentrated in vacuo. The 82 g. of crude product obtained was chromatographed on silica gel and eluted with hexane/acetone mixture to give (20R):16α,18-dihydroxy-3α,11α-diacetoxy-18,20-epoxy-5β-pregnane which when recrystallized from acetone/hexane melted at 195.5–197° C.

EXAMPLE 24

A total of 10 g. of 3β-acetoxy-16α,17-epoxy-20-oxo-5β-pregnan-18-al was dissolved in 200 ml. of pyridine and to this solution there was added with ice cooling 66 ml. of water containing 33 g. of chromium (II) acetate. The mixture was stirred for 90 minutes at room temperature, then cooled to approximately −15° C. and treated dropwise over a period of 10 minutes with a solution of 5 g. of sodium borohydride in 15 ml. of water. The workup and the chromatography followed the procedure described in Example 1. After recrystallization from acetone/hexane there was obtained (20R):16α,18-dihydroxy-3β-acetoxy-18,20-epoxy-5β-pregnane melting at 118–125° C.

EXAMPLE 25

A total of 3 g. of 3α,11α,14,16β,18,20β-hexahydroxy-5β,14β-pregnane in 75 ml. of pyridine was stirred for three hours at 25° C. with 9 g. of triphenylchloromethane. The mixture was thrown into ice water, the precipitated product filtered off, dissolved in methylene chloride and the solvent removed in vacuo. The crude product was triturated with pentane, the pentane solution decanted off and the residue recrystallized from acetone/hexane. There was thus obtained 3α,11α,14,16β,20β-pentahydroxy-18-triphenylmethyloxy-5β,14β-pregnane melting at 200–202° C.

EXAMPLE 26

A total of 3.17 g. of 3α,11α,14,16β,20β-pentahydroxy-18-triphenylmethyloxy-5β,14β-pregnane in 20 ml. of pyridine was heated at reflux with 10 ml. of acetic anhydride for 2¾ hours. The reaction mixture was cooled and then stirred into ice water. The precipitated product was filtered off, washed with water, dried and then recrystallized from ether/pentane. There was thus obtained 14-hydroxy-18-triphenylmethyloxy - 3α,11α,16β,20β - tetraacetoxy-5β,14β-pregnane melting at 268–272° C.

EXAMPLE 27

A total 2.7 g. of 14-hydroxy-18-triphenylmethyloxy-3α,11α,16β,20β-tetraacetoxy-5β,14β-pregnane was heated for five minutes on a steam bath in 50 ml. of 80% acetic acid. The solution was stirred into ice water, the precipitated product filtered off, dissolved in methylene chloride, the methylene chloride solution was washed with sodium bicarbonate solution and water, dried over sodium sulfate and the solvent removed in vacuo. After trituration of the residue there was obtained in amorphous form 14,18-dihydroxy - 3α,11α,16β,20β-tetraacetoxy-5β,14β-pregnane.

EXAMPLE 28

To a total of 1.15 g. of 14,18-dihydroxy-3α,11α,16β,20β-tetraacetoxy-5β,14β-pregnane in 10 ml. of dimethylsulfoxide and 7 ml. of triethylamine there was added slowly and in dropwise fashion a solution of 2.6 g. of a pyridine-sulfur trioxide complex in 25 ml. of dimethyl sulfoxide with a temperature being maintained at about 20° C. Thereafter the mixture was stirred for 30 minutes at 20° C., thrown into ice water and acidified with 2 N hydrochloric acid. The precipitated reaction product was filtered off, washed with water and dried. Through thin layer chromatography in a system of methylene chloride: ethyl acetate (1:1) there was separated and isolated 853 mg. of 14 - hydroxy - 3α,11α,16β,20β-tetraacetoxy-5β,14β-pregnan-18-al and 182 mg. of starting material.

EXAMPLE 29

A total of 850 mg. of 14-hydroxy-3α,11α,16β,20β-tetraacetoxy-5β,14β-pregnan-18-al in 40 ml. of a 10% ethanolic methylamine solution was stirred for 15 minutes at 20° C. and then concentrated in vacuo. The residue was dissolved in 40 ml. of methanol and then together with 300 mg. of platinum oxide was hydrogenated. The catalyst was filtered off, the solvent was removed in vacuo and the residue was chromatographed on a Kieselgel plate in a system of benzene/methanol (8:2). There was thus obtained 650 mg. of 18-(methylamino)-14-hydroxy-3α,11α,16β,20β-tetraacetoxy-5β,14β-pregnane.

EXAMPLE 30

A total of 480 mg. of 18-(methylamino)-14-hydroxy-3α,11α,16β,20β - tetraacetoxy - 5β,14β - pregnane was dissolved in 5 ml. of absolute tetrahydrofuran, cooled to 0° C. and then treated dropwise with a solution containing 0.122 ml. of chloroacetyl chloride in 2 ml. of tetrahydrofuran. The reaction mixture was stirred 10 minutes at 0–5° C., diluted and methylene chloride, washed to neutrality and concentrated. The residue was chromatographed on a silica gel plate utilizing a system of benzene/methanol (85:15). There was thus obtained 100 mg. of 18 - (methyl - chloracetylamino)-14-hydroxy-3α,11α,16β,20β-tetraacetoxy-5β,14β-pregnane.

EXAMPLE 31

A total of 5.5 g. of 20-hydroxy-14β,18-isopropylidenedioxy-3α,11α,16β-triacetoxy-5β-pregnane was dissolved in 150 ml. of tetrahydrofuran and then together with 15 ml. of 2 N hydrochloric acid was stirred for 80 minutes at 25° C. The reaction mixture was worked up by throwing into ice water and extracting with ethyl acetate. The ethyl acetate solution was washed to neutrality with water and concentrated in vacuo. The resulting 14β,18,20-trihydroxy-3α,11α,16β-triacetoxy-5β-pregnane was dissolved in 40 ml. of dimethyl sulfoxide and 28 ml. of triethylamine and was then treated at 20° C. with a solution of 12 g. of a pyridine-sulfur trioxide complex in 30 ml. of dimethylsulfoxide in dropwise fashion. The reaction mixture was stirred for one hour at 20° C., thrown into ice water and acidified with 1 N hydrochloric acid. The precipitated reaction product was filtered off, washed with water and dried. The crude product was chromatographed on silica gel. Utilizing gradation elution with a hexane/hexane/acetone (1:1) mixture there was obtained amorphous 14β,18 - dihydroxy - 3α,11α,16β-triacetoxy-18,20-epoxy-5β-pregnane.

EXAMPLE 32

A total of 3.1 g. of 14β,18-dihydroxy-3α,11α,16β-triacetoxy - 18,20 - epoxy-5β-pregnane was stirred for 4½ hours at 120° C. in 60 ml. of an ethanol-methylamine mixture (9:1) in a glass autoclave. Thereafter the reaction mixture was concentrated in vacuo. The obtained 18-(methylamino) - 14β,16β-dihydroxy-3α,11α-diacetoxy-18,20-epoxy-5β-pregnane was dissolved in 30 ml. of glacial acetic acid and then together with 1.5 g. of platinum oxide was hydrogenated at 80° C. After cooling the catalyst was filtered off, washed with methylene chloride, the filtrate washed with sodium bicarbonate solution and water and then concentrated in vacuo. The resulting crude 18 - (methylamino) - 14β,16β,20β-trihydroxy-3α,11α-diacetoxy-5β-pregnane was treated with chloracetyl chloride and isolated according to the procedure described in Example 13. After recrystallization from acetone/hexane the product 18 - (methylchloracetylamino) - 14β,16β,20β - trihydroxy-3α,11α-diacetoxy-β-pregnane melted at 184–186° C.

EXAMPLE 33

A total of 7.8 g. of 3α,14,16β,18,20β-pentahydroxy-5β,14β-pregnane was stirred in 150 ml. of pyridine with 22 g. of chloro-tris-p-methoxy-phenyl-methane for two hours at 20° C. After workup according to Example 25 the obtained crude 3α,14β,16,20β-tetrahydroxy - 18 - tris-p-methoxyphenylmethoxy)-5β,14β-pregnane was heated at reflux for three hours in 50 ml. of pyridine with 25 ml. of acetic anhydride. The reaction mixture was stirred into ice water, the precipitated reaction product filtered off, washed with water and dried. After recrystallization from ether-pentane there was obtained 14-hydroxy-18-(tris-p-methoxyphenylmethyloxy) - 3α,16β,20β - triacetoxy-5β,14β-pregnane melting at 270–272° C.

EXAMPLE 34

A total of 5 g. of 14-hydroxy-18-(tris-methoxyphenylmethyloxy) - 3α,16β,20β-triacetoxy-5β,14β-pregnane was heated at 60° C. for three minutes in 100 ml. of 80% of acetic acid. After workup in accordance with Example 27 the obtained crude 14,18-dihydroxy - 3β,16β,20β-triacetoxy-5β,14β-pregnane was oxidized in the manner described in Example 28. The resulting 14-hydroxy-3β,16β,20β-triacetoxy-5β,14β-pregnan-18-al melted, after recrystallization from cyclohexane at 77–80° C.

EXAMPLE 35

A total of 2.6 g. of 14-hydroxy-3β,16β,20β-triacetoxy-5β,14β-pregnan-18-al was stirred at room temperature for 20 minutes in 85 ml. of a 10% ethanolic methylamine solution. The reaction solution was concentrated in vacuo, the residue was dissolved in 85 ml. of methanol and then together with 500 mg. of platinum oxide was hydrogenated. After isolation according to the procedure of Example 29 there was thus obtained 18-(methylamino)-14-hydroxy-3β,16β,20β-triacetoxy - 5β,14β - pregnane which was reacted with chloracetyl chloride according to the procedure of Example 30. After recrystallization from acetone/hexane there was obtained 18-(methyl-chloracetylamino)-14-hydroxy - 3β,16β,20β - triacetoxy - 5β,14β-pregnane melting at 172–174° C.

What is claimed is:

1. A compound of the formula

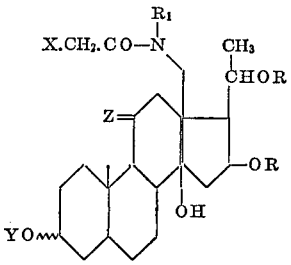

wherein R is hydrogen or lower acyl; $R_1$ is hydrogen or lower alkyl; X is halogen or a free or esterified hydroxy group; Y is hydrogen, acyl or alkyl; and Z is an oxygen atom, H,H or H,$OR_2$ wherein $R_2$ is hydrogen or acyl.

2. The compound of claim 1 wherein X is halogen and Y is acyl.

3. The compound of claim 2 which is 18 - (methylchloracetylamino)-14β,16β,20β-trihydroxy - 3β - acetoxy-5β-pregnane.

4. The compound of claim 2 which is 18-(methylchloracetylamino)-14β,16β,20β-trihydroxy - 3α,11α - diacetoxy-5β-pregnane.

5. The compound of claim 2 which is 18-(methylchloracetylamino)-14β-hydroxy - 3β,16β,20β - triacetoxy-5β-pregnane.

6. The compound of claim 2 which is 18-(methylchloracetylamino) - 14 - hydroxy-3α,11α,16β,20β - tetraacetoxy-5β,14β-pregnane.

7. A compound of the formula

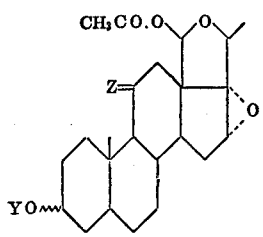

wherein Y is hydrogen, acyl or alkyl; and Z is an oxygen atom, H,H or H,OR$_2$ wherein R$_2$ is hydrogen or acyl.

8. A compound of the formula

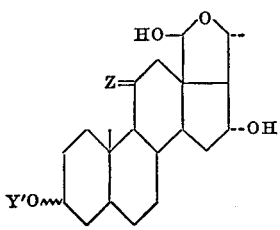

wherein Y' is hydrogen, acyl or alkyl; and Z is an oxygen atom, H,H or H,OR$_2$ wherein R$_2$ is hydrogen or acyl.

9. A compound of the formula

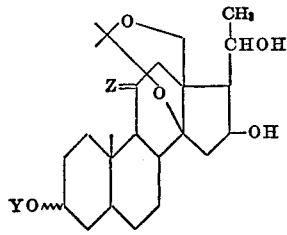

wherein Y is hydrogen, acyl or alkyl and Z is an oxygen atom, H,H or H,OR$_2$ wherein R$_2$ is hydrogen or acyl.

10. A compound of the formula

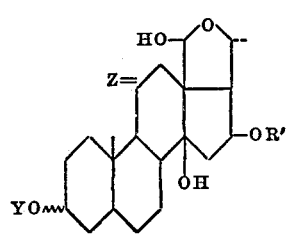

wherein R' is lower acyl; Y is hydrogen, acyl or alkyl; and Z is an oxygen atom, H,H or H,OR$_2$ wherein R$_2$ is hydrogen or acyl.

11. A compound of the formula

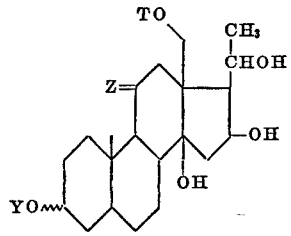

wherein T is triarylmethyl; Y is hydrogen, acyl or alkyl; and Z is oxygen atom, H,H or H,OR$_2$ wherein R$_2$ is hydrogen or acyl.

12. 20-hydroxy-3β-acetoxy - 16 - oxo-5β-pregn-14-en-18-acid lactone-(18→20).

13. 16β,20-dihydroxy - 3β - acetoxy-5β-pregn-14-en-18-acid lactone (18→20).

14. 3β,14β,16β,18,20-pentahydroxy-5β-pregnane.

15. 18-(methylamino) - 14β,16β - dihydroxy-3β-acetoxy-18,20-epoxy-5β-pregnane.

16. 18 - (methylamino)-14β,16β,20β-trihydroxy-3β-acetoxy-5β-pregnane.

17. 14-hydroxy-3α,11α,16β,20β - tetraacetoxy - 5β,14β-pregnan-18-al.

18. 18 - (methylamino) - 14 - hydroxy-3α,11α,16β,20-tetraacetoxy-5β-pregnane.

19. 18-(methylamino) - 14β,16β, - dihydroxy-3α,11α-diacetoxy-18,20-epoxy-5β-pregnane.

20. 14,18 - dihydroxy - 3β,16β,20β - triacetoxy-5β,14β-pregnane.

21. 14-hydroxy - 3β,16β,20β - triacetoxy-5β,14β-pregnan-18-al.

22. 18-(methylamino) - 14 - hydroxy-3β,16β,20β-triacetoxy-5β,14β-pregnane.

References Cited
UNITED STATES PATENTS
3,578,659   5/1971   Berndt et al. _____ 260—239.55

ELBERT L. ROBERTS, Primary Examiner

U.S. Cl. X.R.

260—239.55 D, 239.57, 397.4, 397.45, 397.47, 239.55 R